United States Patent [19]

Stone

[11] 4,025,729
[45] May 24, 1977

[54] TELEPHONE RINGING CONTROL CIRCUITS

[75] Inventor: Dale Eugene Stone, Cedar Knolls, N.J.

[73] Assignee: Bell Telephone Laboratories, Incorporated, Murray Hill, N.J.

[22] Filed: Dec. 5, 1975

[21] Appl. No.: 638,162

[52] U.S. Cl. .................. 179/84 R; 179/2.5 R; 307/253

[51] Int. Cl.² ............................ H04M 1/26

[58] Field of Search ......... 179/84 R, 2.5 R, 1 SW, 179/18 F; 307/271, 253, 297; 328/183; 321/2

[56] References Cited

UNITED STATES PATENTS

| | | | |
|---|---|---|---|
| 3,471,650 | 10/1969 | Birck | 179/84 A |
| 3,475,561 | 10/1969 | Krasin | 179/2.5 R |
| 3,536,852 | 10/1970 | Dolarmore | 179/84 R |
| 3,601,538 | 8/1971 | May | 179/2.5 R |
| 3,628,066 | 12/1971 | Surprenant | 307/271 |
| 3,681,621 | 8/1972 | Downs | 307/271 |
| 3,714,469 | 1/1973 | Uchida | 307/253 |
| 3,904,833 | 9/1975 | Beene | 179/84 R |

Primary Examiner—William C. Cooper
Assistant Examiner—Joseph A. Popek
Attorney, Agent, or Firm—Robert O. Nimtz

[57] ABSTRACT

A single channel carrier system is disclosed including a remote terminal having a battery charger for charging a battery during idle periods to power the remote carrier electronics. The remote electronics include a ringing generator and a supervisory circuit to implement normal telephone supervision over the carrier channel.

The ringing generator is a dc-to-dc converter for stepping the battery voltage up to the ringing voltage level. In order to interrupt this unipolar ringing voltage and thereby to energize the telephone ringer, a switching circuit is provided including a transistor in shunt with the ringing voltage supply to provide a return path for alternate half cycles of ringing current. A constant current source from a low voltage supply connected to the base of the transistor provides bias current to saturate the transistor yet minimizes the amount of dissipated power.

6 Claims, 10 Drawing Figures

RINGING OUTPUT CIRCUIT

FIG. 1
SINGLE CHANNEL CARRIER SYSTEM

FIG. 2
REMOTE CARRIER TERMINAL

FIG. 3
BATTERY CHARGER AND INTERFACE CIRCUIT

FIG. 4
CHARGER OSCILLATOR

FIG. 5
RINGING OSCILLATOR

FIG. 6
RINGING ENVELOPE DETECTOR CIRCUIT

FIG. 7
POWER SWITCH

FIG. 8
RINGING AMPLIFIER

FIG. 9
RINGING OUTPUT CIRCUIT

FIG. 10
VOLTAGE REGULATOR, SWITCHHOOK AND RING-TRIP DETECTOR CIRCUIT

TELEPHONE RINGING CONTROL CIRCUITS

BACKGROUND OF THE INVENTION

1. Field of the Invention

This invention relates to unidirectional-to-bidirectional switching circuits and, more particularly, to operating telephone ringers from a unidirectional ringing voltage source 2. Description of the Prior Art In the copending application of T. N. Rao- R. Toumani Ser. No. 638,151, filed of even date herewith, there is disclosed a ringing signal generator comprising a direct current level converter. The high ringing voltage level thus generated on an output capacitor must be interrupted at a 20 Hz rate and utilized to energize a telephone ringer. To this end, a transistor switch is connected in parallel with the ringer load to provide a return path for the alternating current signal in the ringer during alternate half cycles. A second transistor switch is connected in series with the high voltage ringing supply to block current flow from the capacitor to the load and shunt switch. An appropriate connection of the two switches with a diode allows the direct operation of the shunt switch to cause the indirect operation of the series switch. Biasing for the series switch is a direct load on the high voltage supply and dissipates considerable power. The shunt switch can be biased from a lower voltage supply and dissipates less power even though each switch carries a similar level of current. A control signal is supplied to the shunt switch to activate both switches appropriately to supply a ringing voltage output. Both transistor switches must withstand the peak ringing voltage when switched OFF and therefore a high voltage transistor is required for each.

SUMMARY OF THE INVENTION

In accordance with the illustrative embodiment of the present invention, the bias supply for the shunt transistor switch is derived from a lower power source. An appropriate connection at the transistor shunt switch and a diode permits continuous biasing of the shunt switch, using the current response of the load to absorb this bias current when the shunt switch is OFF. By making the low power bias supply a constant current source the shunt switch acts as a "Miller integrator," reducing the switching transients.

More importantly, by biasing the switching transistor from a low power source, the need for biasing resistors in the higher power output circuit is avoided. This arrangement therefore also saves large amounts of power which would otherwise be dissipated in the biasing resistor. This savings is important in systems, like the illustrative embodiment, where this power must be supplied from a small local battery. In addition, only one expensive high voltage transistor switch is required.

DETAILED DESCRIPTION

Figure 1:
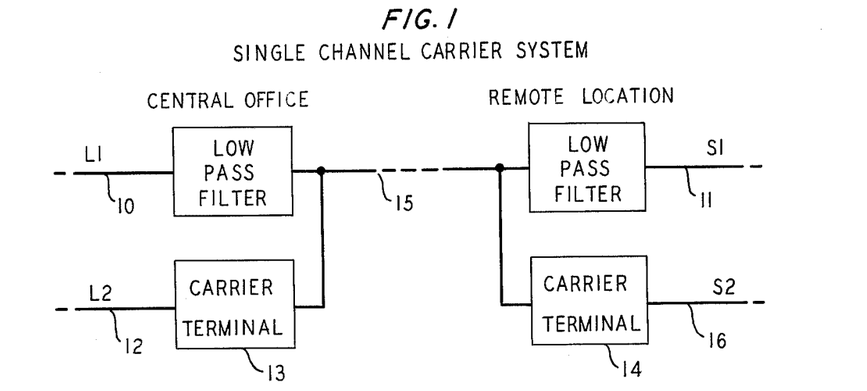
FIG. 1 is a general block diagram of a single channel carrier system of a type in which the present invention may find use.

Referring more particularly to FIG. 1, there is shown a general block diagram of a single-channel carrier system. At the central office of the system a subscriber line appearance 10 is provided for a pair of metallic conductors 15 extending to a telephone subscriber at a remote location and appearing on conductors 11. In accordance with normal usage, telephone service is extended from the central office to the remote subscriber by means of a twisted pair of conductors 15 terminating at appearances 10 and 11.

Two subscribers can be accommodated on this single pair of conductors by utilizing standard analog carrier techniques. Thus, a second appearance 12 in the central office can be provided using a central office carrier terminal 13 and a remote carrier terminal 14 coupled to the metallic conductors 15. The second subscriber can be connected to conductors 16. Terminals 13 and 14 modulate and demodulate the voice signals into and out of frequency bands outside of the voice frequency range. Low-pass filters 17 and 18 block these carrier signals from the first subscriber's voice path extending from appearance 10 to conductors 11 via the same pair 15.

In order to accommodate a telephone subscriber at conductors 16 it is ncessary to transmit between the central office and the second subscriber not only voice signals but also all of the required supervisory signals normally associated with telephone service. Thus, switchhook supervision, ringing, ring trip, and dial pulsing must all be accomplished over the carrier channel. This is done by utilizing the carrier itself as a signaling wave. This carrier can be interrupted at dial pulse or ringing rates and can be turned off and on to transmit switchhook supervision and ringing indications.

Figure 2:
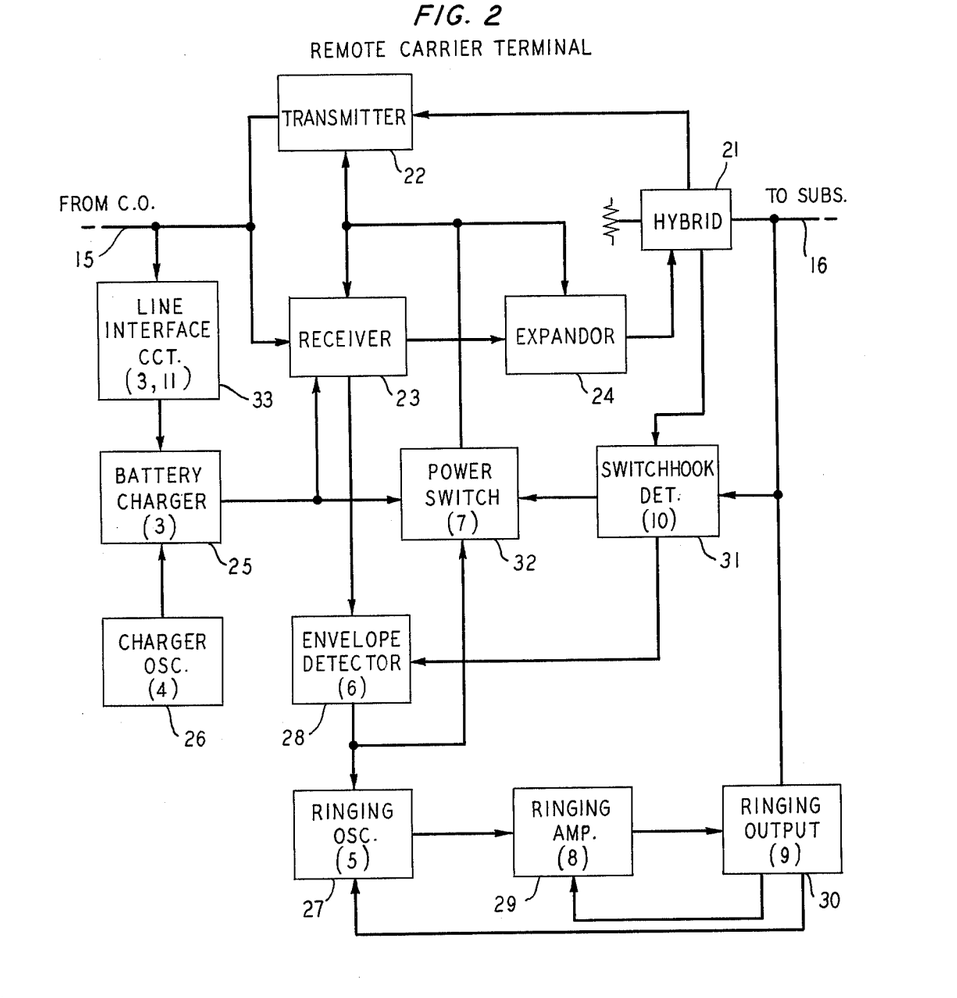
FIG. 2 is a more detailed block diagram of the remote carrier terminal of the system in FIG. 1.

In accordance with an illustrative embodiment of the present invention, a remote carrier terminal is disclosed in block form in FIG. 2. The terminal in FIG. 2 comprises a hybrid 21 for splitting voice signals on line 16 into two paths for the opposite directions of transmission. A carrier transmitter 22 is connected between hybrid 21 and loop 15 for modulating voice frequencies in one direction onto a high frequency carrier (for example, 28 kHz). A carrier receiver 23 and an expandor 24 are also connected between loop 15 and hybrid 21 for demodulating and expanding voice signals from a different carrier frequency (for example 76 kHz) in the other direction. Hybrid 21 is connected to metallic conductors 16 extending to a local subscriber telephone set. The balance of the circuits of FIG. 2 are used to provide the necessary supervisory signaling to supervise the establishment, utilization, and termination of the talking path. A suitable expandor is shown in the copending application of R. Toumani, Ser. No. 497,136 filed Aug. 14, 1974. A suitable transmitter and receiver are shown in the copending application of T. N. Rao and R. Toumani, Ser. No. 638,152, filed of even date herewith.

In order to accommodate a carrier-derived channel on the longest possible telephone subscriber loops, it is necessary that the remote electronics have power available in addition to that received from the central office over the metallic loop. Longer loops having a higher resistance cannot carry adequate current to power the remote electronics with normal line voltages and still provide a sufficiently high voltage to permit efficient talking. Higher voltages applied at the central office, on the other hand, must be specially provided and present distinct hazards to personnel utilizing and maintaining equipment on the telephone lines. A solution to this problem is a rechargeable battery used to power the remote electronics but which may be recharged from the telephone line during periods when the line is not being actively used to provide telephone service To power the remote electronics, a battery charger 25 is provided which is driven by a charger oscillator 26. In accordance with well-known power supply techniques, charger 25 and oscillator 26 comprise a dc-to-dc converter for charging a battery which is used to power the remainder of the circuit in FIG. 2. A line interface circuit 33 protects charger 25 from transients and polarity reversals on loop 15 and presents high impedance to loop 15.

Figure 5:
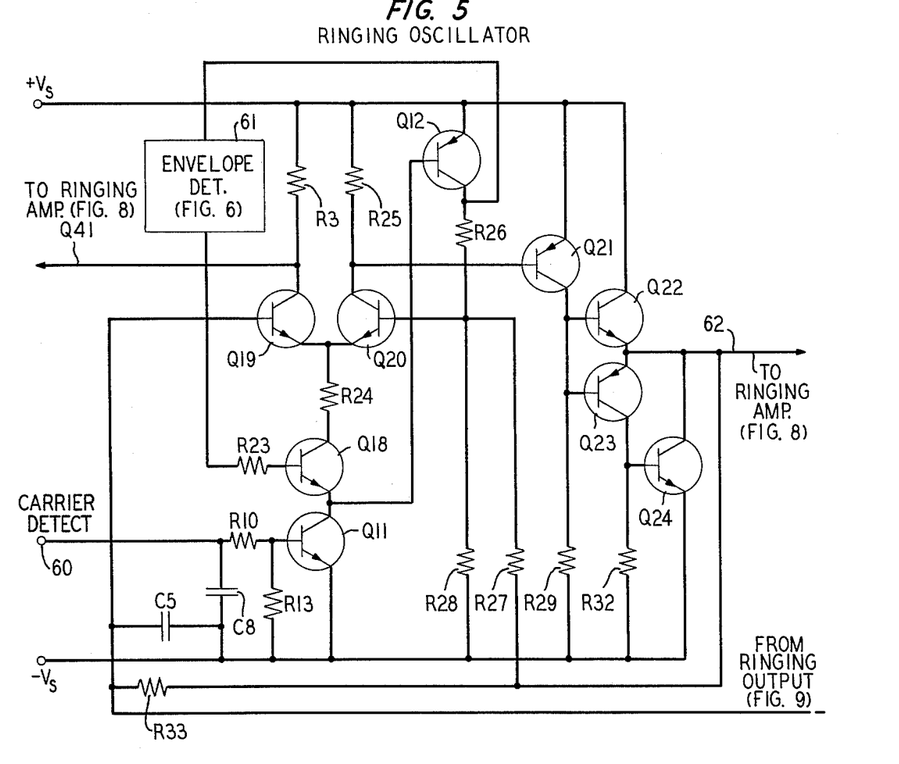
FIG. 5 is a detailed circuit diagram of a ringing oscillator circuit useful in a remote carrier terminal of FIG. 2.
Figure 7:
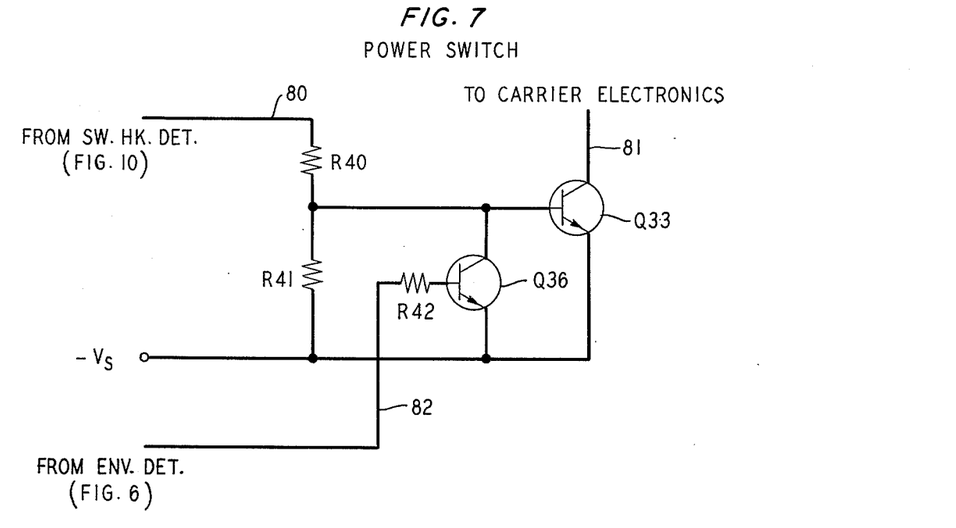
FIG. 7 is a detailed circuit diagram of a power switch useful in the remote carrier terminal of FIG. 2.

Carrier signals detected by carrier receiver 23 are supplied to envelope detector 28, which, after a delay, intermittently enables ringing oscillator 27. Oscillator 27 supplies an interrupted high frequency signal to ringing amplifier 29 (interrupted at a 20 Hz rate). After amplification, the interrupted signal is utilized by a ringing output circuit 30 to supply a high voltage square wave ringing signal of 20 Hz to subscriber line 16. A switchhook detector 31 detects when the local subscriber goes of-hook and, at that time, blocks the high frequency signal from ringing amplifier 29 and enables a power switch 32 to apply power to the balance of receiver 23, transmitter 22, and expandor 24. It will be noted that a portion of carrier receiver 23 must be powered at all times in order to detect the appearance of a carrier signal from the central office. The demodulation and audio portions of the carrier receiver, however, need be energized only after the supervisory signaling is complete and voice transmission is required.

Boxes 25 through 33 in FIG. 2 each include a numeral in parentheses. These numerals correspond to figure numbers in which are found detailed circuit diagrams of the corresponding portions of the remote carrier terminal. These detailed drawings will now be taken up in order.

Figure 3:
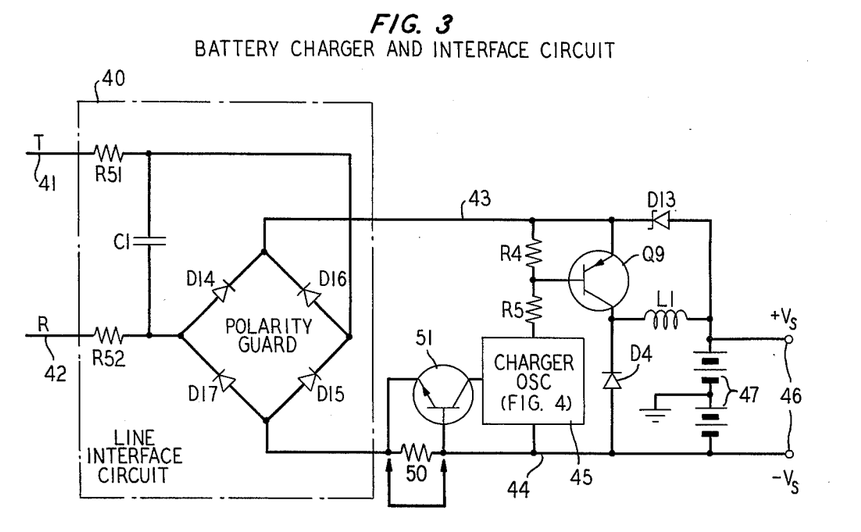
FIG. 3 is a detailed circuit diagram of a battery charger circuit suitable for use in the remote carrier terminal of FIG. 2.

In FIG. 3, there is shown a battery charger suitable for charger 25 in FIG. 2. The battery charger of FIG. 3 is operated from the central office battery by way of conductors 41 and 42 and includes an interface circuit 40. Interface circuit 40 includes a pair of resistors R51 and R52 to ensure a high impedance loading across conductors 41 and 42. Capacitor C1 serves as a filter for high frequency charging components to prevent these signals from being transmitted on conductors 41 and 42. Diodes D14, D15, D16, and D17 are connected in a bridge circuit and serve as a polarity guard to ensure that voltages delivered to the balance of the circuit are poled in a direction such that the upper conductor 43 is at a positive voltage with respect to the lower conductor 44.

The battery charger of FIG. 3 is a switching regulator whose drive is obtained from oscillator 45 which will be discussed in detail in connection with FIG. 4. Pulses of current drawn by oscillator 45 through resistors R4 and R5 serve to alternately cut of and saturate transistor Q9. When transistor Q9 is ON, current flows from conductor 43 through transistor Q9 and inductor L1 to charge battery 47. When transistor Q9 is cut OFF, inductor L1 maintains a current flow through diode D4 to continue charging battery 47. Capacitor C1 filters out the switching transients caused by the intermittent operation of transistor Q9. Zener diode D13 protects transistor Q9 by limiting transient voltages caused by lightning surges or ringing signals on the telephone line to a voltage level which transistor Q9 can sustain. In addition, should battery 47 become completely discharged so that charger oscillator 45 cannot operate, diode D13 serves to trickle charge battery 47 from the telephone line.

The voltage presented at terminals 46 operates the balance of the electronic circuitry at the remote carrier terminal shown in block form in FIG. 2. This voltage is much less than the central ofice voltage and is normally in a range between 7 and 9 volts.

The battery charger of FIG. 3 is designed to draw about 3 milliamperes from the telephone line and deliver 6 milliamperes to charge battery 47. The oscillator duty cycle is chosen such that the voltage drop across the charger is about 24 volts one-half of the line voltage. This ensures maximum power transfer to the battery charger.

If faster charging times are required, the values of resistors R51 and R52 can be reduced. It is desirable under these conditions to make the charger a constant current device rather than a constant voltage device A current detector comprising transistor 51 and resistor 50 is therefore provided to control oscillator 45. Moreover, it may be desirable to disconnect the battery charger entirely to perform tests such as leakage tests during which the charge current would mask true leakage currents. A more complex interface circuit is necessary for this arrangement. The battery charger and interface circuits form the subject matter of the copending application of one of the present applicants, B. S. Bosik, Ser. No. 638,164, filed of even date herewith.

Figure 4:
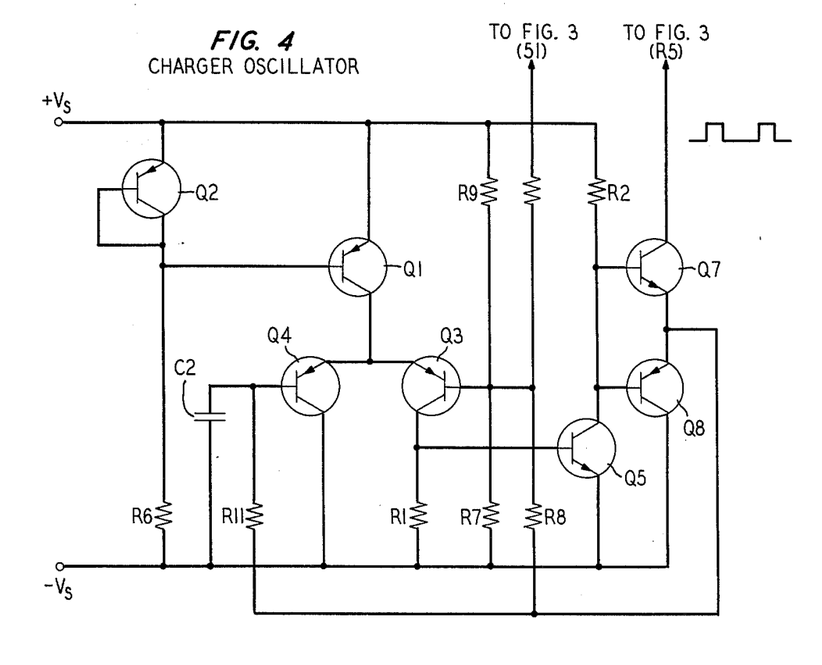
FIG. 4 is a detailed circuit diagram of an oscillator circuit suitable for use in the battery charger of FIG. 3.

The charger oscillator is shown in detailed circuit form in FIG. 4. This circuit, like the remaining circuits of the drawings, is operated by the battery 47 in FIG. 3. The circuit is integrated, permitting transistors Q1 and Q2 to be matched. The collector and base of transistor Q2 are connected together to provide a diode having a fixed voltage drop between the emitter and common terminals. The matching of transistors Q1 and Q2 allows the current in transistor Q1 to be set by the current developed in transistor Q2 by resistor R6. The transistors Q3 and Q4 alternately conduct the current provided by transistor Q1, thereby switching transistor Q5. When transistor Q5 is OFF, transistor Q7 is ON, causing capacitor C2 to charge. When capacitor C2 reaches the proper voltage, transistor Q4 is turned OFF, thus switching transistor Q3 and hence transistor Q5 ON. Transistor Q5 turning ON turns OFF transistor Q7 and allows capacitor C2 to dicharge through transistor Q8. When capacitor C2 discharges sufficiently, transistor Q4 again turns ON, initiating a new cycle. In the illustrative embodiment of FIG. 4, the frequency of this cycle is about 90 kHz.

The frequency and duty cycle of the oscillator of FIG. 4 is under the control of capacitor C2, resistor R11, and the bias voltage at the base of transistor Q3. A control on the duty cycle is afforded by feedback current introduced by resistor 50 and transistor 51 (FIG. 3) through which the output current is sampled. Transistor 51 detects this output current and causes an adjustment in the bias voltage at the base of transistor Q3. This bias voltage adjustment shifts the duty cycle just sufficiently to keep the current drawn by the battery charger of FIG. 3 constant. The battery charger therefore draws a constant current determined by the value of resistor 50. When the value of resistor 50 is zero, the circuit is voltage-controlled and is suitable for the arrangement of FIG. 3.

Referring more particularly to FIG. 5, there is shown a detailed circuit diagram of a ringing oscillator suitable for use as oscillator 27 in FIG. 2. The oscillator of FIG. 5 comprises a differential pair of transistors Q19 and Q20 serving as the active elements of the oscillator. Their emitters are connected together through resistor R24 and transistors Q18 and Q11 to $-V_s$. Transistors Q18 and Q11 each serve as a switch preventing the operation of the oscillator until both of these transistors are turned on.

The ringing oscillator of FIG. 5 is designed to be turned on and off in response to the presence and absence of a carrier signal received at the remote terminal. The carrier interruptions take place at a 20 Hz rate in accordance with standard ringing practice. These interrupted carrier signals are processed and supplied from the carrier receiver 23 (FIG. 2) to terminal 60 of FIG. 5. These processed carrier signals are filtered by capacitor C8 and the voltage thus derived is supplied across the voltage divider made up of resistors R10 and R13 to the base of transistor Q11. The presence of a carrier signal at terminal 60 therefore turns transistor Q11 ON to provide a signal to the base of transistor Q12. When thus enabled, transistor Q12 enables the biasing circuit for transistor Q20 comprising resistors R26 and R28. At the same time, a signal is provided from the collector of transistor Q12 to envelope detector 61 to be described in detail in connection with FIG. 6. Detector circuit 61 inserts a delay before supplying a signal through resistor R23 to the base of transistor Q18. This delay ensures that random bursts of noise at terminal 60 are not inadvertently interpreted as ringing signals. Thus, transistors Q19 and Q20 are enabled only if a carrier signal is present and remains present beyond the delay period of delay circuit 61 to simultaneously enable transistors Q11 and Q18. Transistor Q12 blocks the biasing circuit for transistor Q20 when the oscillator is not in use, thus conserving power during the idle state.

The collector of transistor Q20 is connected to the base of transistor Q21 to turn the latter transistor ON. When thus turned ON, transistor Q21 also turns ON transistor Q22. The voltage at output lead 62 is connected through resistors R33 and R27 to the respective bases of transistors Q19 and Q20. Capacitor C5 combined with resistor R33 provides the timing elements for the oscillator to set the oscillator frequency well above the audio range, e.g., 50 kHz. Portions of the ringing oscillator described here is claimed in the copending application of T. N. Rao and R. Toumani, Ser. No. 638,151, filed of even date herewith.

Figure 6:
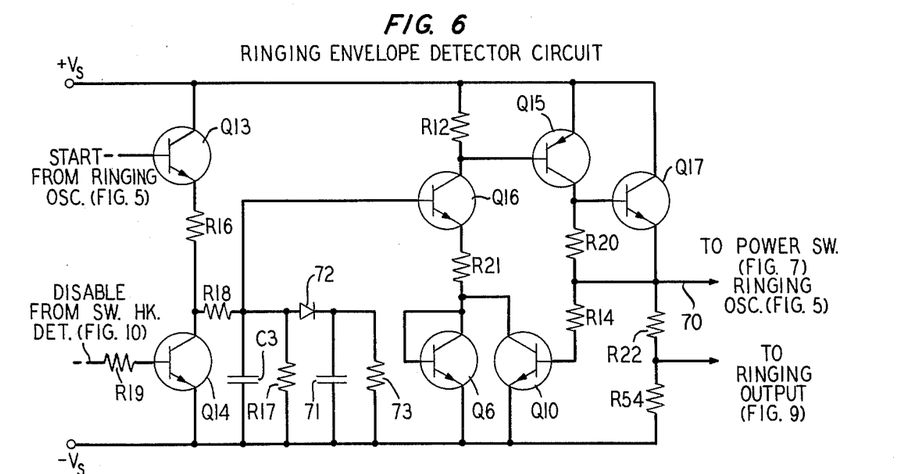
FIG. 6 is a detailed circuit diagram of a ringing envelope detector circuit suitable for use in the ringing oscillator of FIG. 5.

In FIG. 6 there is shown a detailed circuit diagram of a ringing signal envelope detector circuit suitable for the detector circuit 28 in FIG. 2 and the detector circuit 61 in FIG. 5. Signals from the collector of transistor Q12 in FIG. 5 are connected to the base of transisitor Q13. When thus turned ON at a 20 Hz rate, Q13 supplies voltage through resistors R16 and R18 to charge capacitor C3. Resistor R17 provides a slow discharge path for capacitor C3 when transistor Q13 is no longer enabled.

Diode 72 provides a threshold voltage which is exceeded when the charge on capacitor C3 reaches the necessary threshold. When diode 72 conducts, a very large capacitor 71 is placed in parallel with capacitor C3 to reduce the rate of voltage buildup. Resistor 73 is of a very high value to provide a long time constant (e.g., 10 seconds) in the discharge path of capacitor 71. Diode 72 prevents capacitor 71 from affecting the discharge rate (e.g., 100-150 milliseconds) of capacitor C3.

As a result of the presence of capacitor 71, the rate at which charge can build up on capacitor C3 is slowed considerably, but only for the initial ringing cycle. Once capacitor 71 becomes fully charged, it holds this charge throughout the current ringing sequence. Due to diode 72, capacitor 71 is therefore effectively out of the circuit after it charged on the first ringing cycle. This provides a very large margin against false ringing on the first cycle, yet permits subsequent ringing cycles to be tracked relatively closely.

Figure 9:
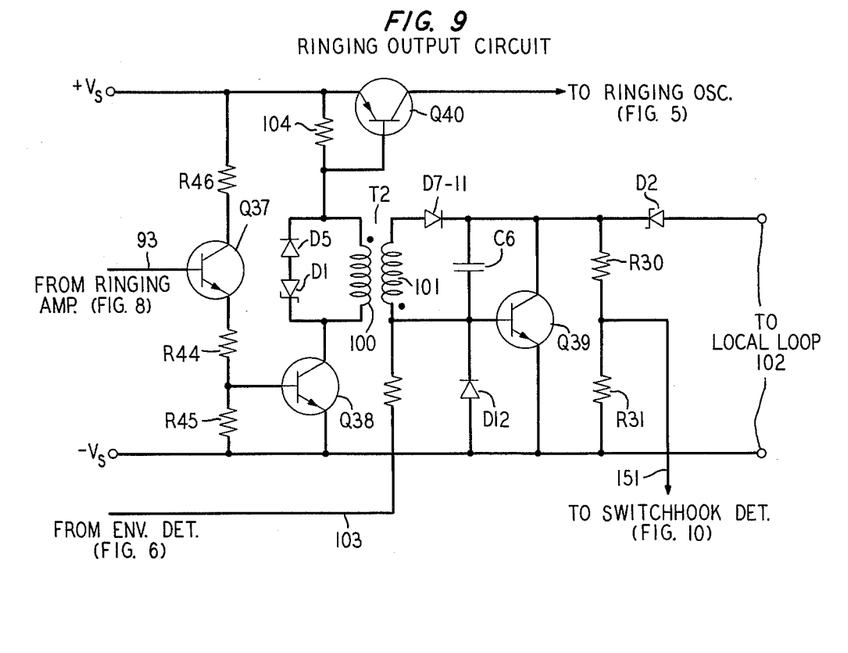
FIG. 9 is a detailed circuit diagram of a ringing output circuit suitable for use with the ringing amplifier circuit of FIG. 8 in the remote carrier terminal of FIG. 2.

When sufficient charge builds up on capacitor C3, transistor Q16 is enabled which, in turn, enables transistors Q15 and Q17. An output signal is thus provided on output lead 70 to enable the ringing oscillator (FIG. 5) and disable the power switch (FIG. 7) a time delay period (e.g., 25-150 milliseconds) after the application of 20 Hz signals to the base of transistor Q13. This provides a delay in reacting to all inputs and therefore provides immunity against transient noise inputs. A second output is taken from the emitter of Q17 to block switchhook detection (FIG. 9) while ringing is present. A third output from the junction of resistors R22 and R54 enables the ringing output circuit by providing a base bias current to transistor Q39 (FIG. 9).

The emitter of transistor Q16 is connected through resistor R21 and transistor Q6 to the negative voltage level $-V_s$. Transistor Q6 has its base connected to its collector to provide a diode action having a significant voltage threshold. This voltage threshold must be overcome before transistor Q16 can be turned ON by the voltage on capacitor C3. Once transistor Q16 is turned ON, however, the signal at output lead 70 is connected through resistor R14 to the base of transistor Q10. Transistor Q10 operates as a switch to short out the diode element formed by transistor Q6. The voltage necessary to enable transistor Q16 therefore drops substantially (by the threshold voltage of diode Q6) and thus the voltage on capacitor C3 must discharge to this lower level before transistor Q16 is disabled. By means of this technique, a certain amount of hysteresis is introduced in the delay function so that even immediately after enabling the ringing generator there is some immunity to spurious ring-trip pulses. This immunity arises from the necessity to discharge capacitor C3 to the lower voltage before ring-trip can disable the ringing oscillator.

A transistor Q14 is provided to serve as a switch to discharge the timing circuit. When enabled by a signal from the switchhook detector of FIG. 10 through resistor R19, transistor Q14 shorts out the charging path for capacitor C3 and prevents transistor Q16 from ever being turned ON. If transistor Q16 is already ON, C3 discharges through resistor R18 and transistor Q14 until Q16 is turned OFF. The signal to the base of transistor Q14 is provided in response to the detection of an off-hook condition (FIG. 10) and thus removes ringing signals when the subscriber goes off-hook. The ring-trip function is supplied locally at the remote terminal through this circuit arrangement. This ringing control circuitry is obtained in the copending application of the present inventor and B. S. Bosik, Ser. No. 638,163, filed of even date herewith.

In FIG. 7 there is shown a power switch circuit which supplies battery power to the carrier transmitter 22, expandor 24, and carrier receiver 23 in FIG. 2. The carrier detector portion of the carrier receiver 23 is continually powered to permit the detection of the carrier signal indicating the need to generate ringing signals. The rest of the carrier receiver 23, the expandor 24, and the carrier transmitter 22, however, need not be powered until the local subscriber lifts his hadnset either to initiate a telephone call or in response to a ringing signal. Considerable power can be conserved by powering these circuits only when they are required for active telephone service.

The power switch of FIG. 7 comprises transistors Q33 and Q36 and resistors R40, R41 and R42. When the switchhook detector (FIG. 10) detects an off-hook condition, a positive voltage is sent to the power switch on lead 80, biasing the base of transistor Q33 high so long as transistor Q36 is not conducting. Transistor Q33 then connects the negative power leads of the switched parts of the carrier electronics (22, 23 and 24 in FIG. 2) to the $-V_s$ terminal via lead 81. Should the envelope detector have just detected carrier signals from the central office indicating ringing, it will hold lead 82 high and cause transistor Q36 to conduct. This action prevents transistor Q33 from conducting due to false switchhook detection during ringing. Legitimate switchhook detection, after a time delay, forces the envelope detector output on lead 82 low and allows the power switch to operate. During customer originated calls, the lead 82 is never high and switchhook detection switches on the electronics via transistor Q33 immediately.

Figure 8:
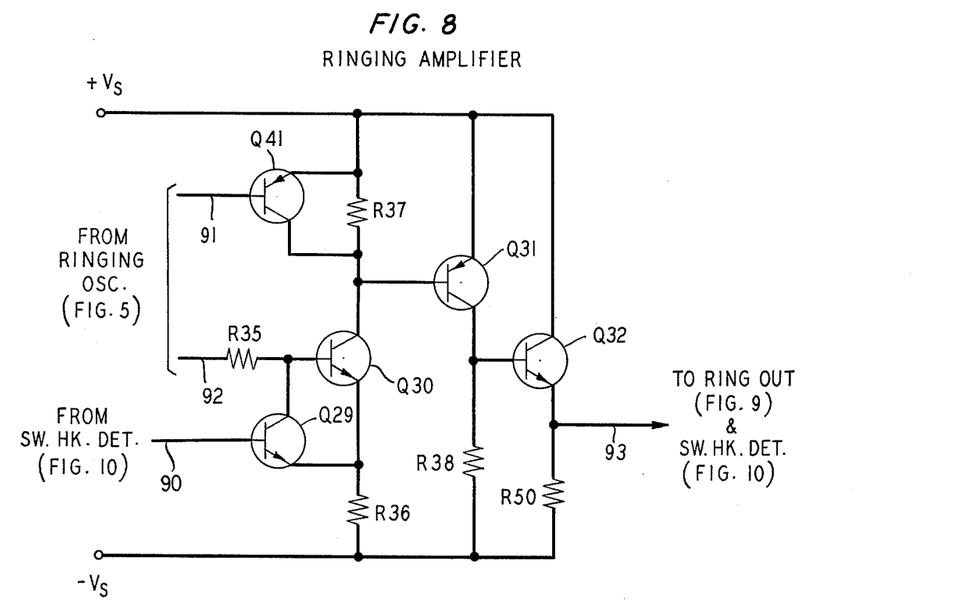
FIG. 8 is a detailed circuit of the diagram of a ringing amplifier circuit suitable for use with the ringing oscillator circuit of FIG. 5 in the remote carrier terminal of FIG. 2.

In FIG. 8 there is shown a detailed circuit diagram of the ringing amplifier shown in block form as ringing amplifier 29 in FIG. 2. The ringing amplifier comprises a cascade of transistor amplifiers Q30, Q31, and Q32. The amplifier is used to raise the power level of the signals from the ringing oscillator of FIG. 5 delivered through lead 92 and resistor R35 to the base of transistor Q30.

Transistor Q29 comprises a voltage regulator. Transistor Q29 has its emitter-collector path connected across the base-emitter path of transistor Q30. A high voltage on lead 90 causes transistor Q29 to conduct, blocking transistor Q30 from conducting. The output of the ringing oscillator (FIG. 5) on lead 92 is thereby prevented from being amplified. The ringing voltage therefore decays until it is again within the desired voltage limit. The base of transistor Q29 then goes low to enable transistor Q30 and allow the oscillator output to be amplified. This technique is used to voltage limit the ringing signal in response to a dynamic comparison of the ringing voltage with a reference voltage as will be described in connection with FIG. 10.

A signal from the ringing oscillator of FIG. 5 is supplied by way of lead 91 to the base of transistor Q41. The collector-emitter path of transistor Q41 thereby shorts out bias resistor R37 in synchronism with the removal of ringing oscillator signals on lead 92. This ensures a fast turn-OFF time for PNP transistor Q31 so that the duty cycle of the pulse train remains well controlled.

In FIG. 9 there is shown a detailed circuit diagram of a ringing output circuit suitable for output circuit 30 in FIG. 2. It comprises a transistor amplifier Q37 driven by amplified ringer oscillator signals on lead 93. When operated by a signal on base lead 93, transistor Q37 operates power transistor Q38 to draw a pulse of current through primary winding 100 of transformer T2. The current pulse establishes a flux in transformer T2 as well as a larger voltage across the secondary winding 101 of transformer T2. This secondary voltage reverse biases diode D7-11 so that no secondary current flows. When transistor Q38 turns OFF, the induced voltage in secondary winding 101 forward biases diode D7-11 to charge capacitor C6. This action is repetitive to keep capacitor C6 charged up to the ringing voltage even while ringing current is drawn by loop 102.

Since the ringing oscillator of FIG. 5 is enabled and disabled at 20 Hz the voltage on capacitor C6 builds up in short pulses to the higher voltage (e.g., 175 volts). As this voltage builds up across capacitor C6, current is delivered through diode D2 and leads 102 to the local subscriber's ringer. The return path for this current includes diode D12. Transistor Q39 is therefore held in a cutoff condition due to the reverse biasing of its base-emitter junction, so long as the ringing current exceeds the current supplied via lead 103 from the envelope detector of FIG. 6.

When the current supplied to loop 102 falls below that supplied on lead 103, transistor Q39 turns ON, to provide a reverse current path for ringing signals. When the high frequency pulses to transformer T2 cease (due to disablement of the ringing oscillator in FIG. 5), capacitor C6 discharges at a rate essentially equal to the ratio of C6 and the current supplied by lead 103. Together transistor Q39 and capacitor C6 gorm a "Miller integrator" to render the discharge rate of capacitor C6 essentially linear during this portion of the cycle. When capacitor C6 is fully discharged, the current on lead 103 from FIG. 6 continues to flow. Instead of discharging capacitor C6, this current flows through the base-emitter junction of transistor Q39, saturating it. Transistor Q39 therefore remains saturated throughout the OFF half-cycle of the 20 Hz ringing cycle, providing a path for negative load current.

Diodes D1 and D5 are connected across the primary winding 100 of transformer T2 to limit the transient voltage across this winding in order to protect transistor Q38 from excessive collector-emitter voltages. A resistor 104 senses the current delivered to the primary winding 100 and, should this current exceed a preselected threshold, the base-emitter junction of transistor Q40 is forward biased and a current is delivered by its collector to the ringing oscillator of FIG. 5. This current rapidly charges capacitor C5 and turns the ringing oscillator OFF for the balance of the high frequency cycle. This action dynamically limits the peak current of the ringing signal, preventing saturation of transformer T2 and preventing exceeding the current rating of transistor Q38. In addition, it prevents delivering exorbitant currents when ringing is applied to an off-hook phone or while there is a fault condition on the local loop 102.

It can be seen that the output ringing signal is both voltage and current limited on a dynamic peak basis. Voltage limitation was described in connection with FIG. 7. Current limitation takes place via resistor 104 and transistor Q40. Together, these two arrangements ensure protection of the circuit components and the avoidance of extreme ringing transients.

A voltage divider including resistors R30 and R31 delivers an indication of instantaneous ringing voltage to lead 151. This signal is used to control voltage limiting of the ringing signal as will be described in connection with FIG. 10. A zener diode D2 connects the ringing signal to the subscriber loop 102. Since diode D2 breaks down only in the presence of ringing voltages, it operates to isolate the ringing source from the talking circuit in the absence of ringing. The ringing signals are unipolar, swinging between a high positive voltage and a low positive voltage.

Figure 10:
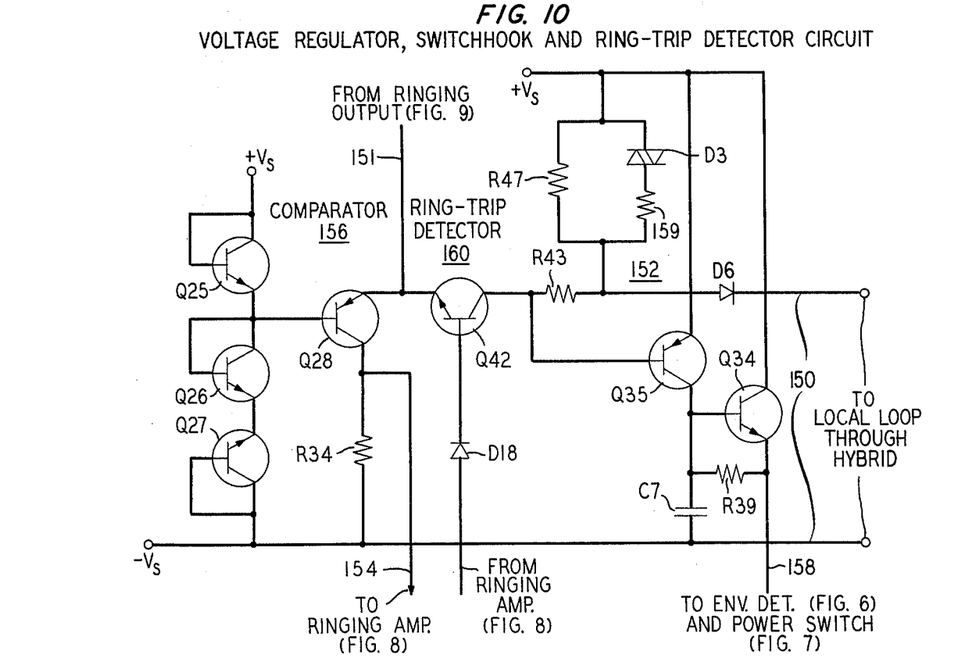
FIG. 10 is a detailed circuit diagram of a switchhook detector circuit suitable for use in the remote carrier terminal of FIG. 2.

In FIG. 10 there is shown a switchhook and ring-trip detector connected to the local telephone loop 150 and including a comparator 156 and a switchhook signal level detector 152. Comparator 156 takes one input on lead 151 from the voltage divider including resistors R30 and R31, described in detail in connection with FIG. 9. A reference signal is developed by transistors Q26 and Q27, transistor Q26 being connected in normal diode arrangements and transistor Q27 being connected as a zener diode. When the voltage on lead 151 exceeds that on the base of transistor Q28, transistor Q28 turns ON and a signal is provided, via lead 154, to FIG. 8 to turn transistor Q29 ON as previusly described. This provides voltage regulation of the ringing supply output.

The ring-trip detector 160 comprises a transistor Q42 and diode D18. The signal on lead 151 follows the 20 Hz ringing signal and therefore is high during most of the positive half of the ringing cycle. The base of transistor Q42 is connected via diode D18 to the output of the ringing amplifier in FIG. 8. The base therefore goes high with the ringing oscillator signal. With its emitter high and its base intermittently high or low, transistor Q42 remains OFF. Once the customer goes off-hook, the additional loading on the loop 102 (FIG. 9) prevents the output circuit from holding lead 151 high. Q42 then conducts on each positive pulse of the high frequency oscillator to its base through diode D18. In so doing, it causes Q35 to conduct during these intervals. Capacitor C7 filters these pulses of current so that Q34 is held on continuously, thus providing a switchhook detection signal to the power switch of FIG. 7 on lead 158.

The switchhook level detector consists of a resistor-diode network 152 consisting of resistors R47 and 159 and diode D3 to give a desired voltage versus current characteristic. Also included are transistors Q35 and Q34, and resistor R39. For small loop currents (e.g., less than 5mA) drawn through network 152, the voltage across the base-emitter junction of transistor Q35 is too small to turn transistor Q35 ON, thus providing immunity to false switchhook indications due to noise, etc. At a prescribed current, transistor Q35 and then transistor Q34 turns ON to supply a switchhook indication to the power switch of FIG. 7.

The switchhook detector supplies a signal to the envelope detector of FIG. 6 to block the ringing voltage generation (transistor Q14). It also supplies a signal to the power switch (lead 80) to turn the electronics on when the envelope detector is not providing a high output signal.

As discussed in connection with FIGS. 2 and 3, the battery charger can be arranged as a constant voltage device or as a constant current device depending on the value of resistor 50 in FIG. 4. Used as a constant voltage device, the value of resistor 50 is made zero and maximum power transfer takes place for fixed values of resistors R51 and R52 in FIG. 3. Resistors R51 and R52 are selected to provide a substantial bridging impedance and allow the use of the simple interface circuit in FIG. 3.

What is claimed is:
1. A switching circuit for supplying an alternating current to a load from a unidirectional source comprising
   a unidirectional source of intermittent voltage,
   a capacitor connected across said source,
   an alternating current load,
   a diode connecting said capacitor and said load in a series circuit,
   a transistor having its collector-emitter path connected across said load, and
   a constant current source connected to the base of said transistor.
2. The switching circuit according to claim 1 wherein said unidirectional source comprises a direct current to direct current voltage level converter enabled at a preselected rate.
3. The switching circuit according to claim 1 wherein said load comprises a telephone ringer.
4. A ringing generator comprising
   a source of ringing voltage,
   a capacitor connected to be charged by said ringing voltage,
   a transistor connected to provide a return path for negative half cycles of said ringing voltage, said capacitor being connected between the base and collector of said transistor,
   a diode connected in parallel with and poled oppositely to the base-emitter junction of said transistor, and
   a constant current source connected to the base of said transistor.
5. The ringing generator according to claim 4 wherein said source of ringing voltage comprises a direct current level converter enabled at a ringing signal rate.
6. A switching circuit for high power signals comprising
   a load for said signals,
   a power source to operate said load,
   a transistor switch connected in shunt with said source and said load, and
   a constant current source derived independently of said power source connected to the control electrode of said transistor.

* * * * *